C. A. HEINZELMAN.
CAGE FOR ROLLER BEARINGS.
APPLICATION FILED JULY 25, 1911.

1,030,400. Patented June 25, 1912.

Witnesses:
Geo. R. Ladson
Nells L. Church

Inventor,
Chester A. Heinzelman.
By Paul Bakewell Atty.

UNITED STATES PATENT OFFICE.

CHESTER A. HEINZELMAN, OF BELLEVILLE, ILLINOIS.

CAGE FOR ROLLER-BEARINGS.

1,030,400.  Specification of Letters Patent.  Patented June 25, 1912.

Application filed July 25, 1911. Serial No. 640,436.

*To all whom it may concern:*

Be it known that I, CHESTER A. HEINZELMAN, a citizen of the United States, residing at Belleville, Illinois, have invented a certain new and useful Improvement in Cages for Roller-Bearings, of which the following is a full, clear, and exact description, such as will enable others skilled in the art to which it appertains to make and use the same.

This invention relates to roller bearing cages, and has for its object to provide a cage which is strong, light and inexpensive to manufacture.

Figure 1:
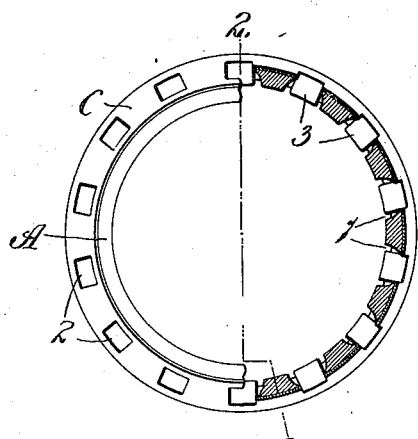
Figure 2:
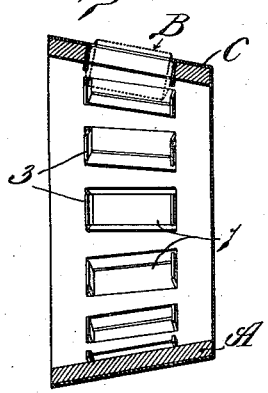
Figure 3:
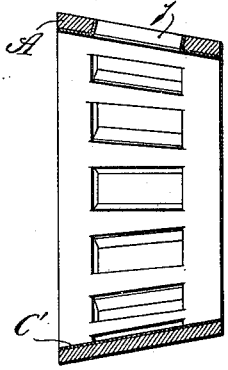
Figure 4:
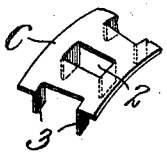
Figure 6:
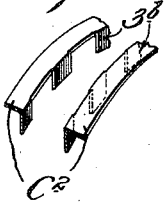
Figure 5:
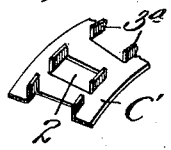

Figure 1 of the drawings is an end elevational view, partly in section, of a cage constructed in accordance with my invention; Fig. 2 is a longitudinal sectional view taken on the line 2—2 of Fig. 1; Fig. 3 is a view similar to Fig. 2 of a slight modification; Fig. 4 is a perspective view of a portion of the reinforcing member that forms part of the cage illustrated in Figs. 1 and 2; Fig. 5 is a perspective view of a portion of the reinforcing member that forms part of the cage shown in Fig. 3; and Fig. 6 is a perspective view illustrating still another form of reinforcing device that may be used.

Referring to the drawings which illustrate the preferred form of my invention, A designates a tapered cylindrical-shaped cast metal member that is provided with openings 1 for receiving the rollers B which are arranged between the inner and outer members of the bearing not shown. This member A is cast in one piece and it is reinforced and strengthened by means of a sheet metal member C which is preferably arranged in the die in which the member A is cast prior to the operation of pouring the molten metal into the die.

In the form of my invention illustrated in Figs. 1 and 2, the reinforcing member C conforms to the shape of the member A and is arranged on the outside of same. Said reinforcing member is formed from sheet metal, and the openings 2 in same, which receive the rollers B, are formed by slitting the member C longitudinally and then bending portions of same inwardly so as to form two ears 3 at the ends of each opening 2. These ears 3 extend inwardly over the end walls of the openings 1 in the member A and thus form bearing surfaces for the ends of the rollers B, as shown in Fig. 2. By constructing the cage in this manner I prevent the cast metal member A from wearing away quickly at the points where the rollers B exert end thrusts on same, namely, at the ends of the roller openings 1 in said member. Another desirable feature of such a construction is that it is light and also very strong for the sheet metal member C reinforces and strengthens the cast metal body portion A of the cage. And still another desirable feature of such a cage is that it is inexpensive to manufacture owing to the fact that the member A is cast in one piece, the member C is stamped out of thin sheet metal, and said members are combined and connected together during the operation of casting the member A.

Instead of arranging the reinforcing member on the outside of the cast metal member which forms the body portion of the cage, the reinforcing member C' can be arranged on the inner side of the cast metal member A, as shown in Fig. 3, the ears $3^a$ on said reinforcing member which protect the end walls of the roller openings in the member A, projecting outwardly from the member C', as shown in Figs. 3 and 5.

While I prefer to form the reinforcing member in one piece I do not wish it to be understood that my invention is limited to such a construction for, if desired, two reinforcing rings $C^2$ can be arranged adjacent the ends of the cast metal member A either on the outside of said member or on the inner side of same, said rings having ears $3^b$ which cover the end walls of the roller openings 1 in the cast metal member A and thus form bearing surfaces for the ends of said rollers.

Having thus described my invention, what I claim as new and desire to secure by Letters Patent is:

1. A roller bearing cage consisting of a substantially cylindrical-shaped cast metal body portion provided with longitudinally extending roller openings, and a ring-shaped metallic reinforcing member permanently connected to said body portion so as to strengthen same and provided with portions which project into said roller openings so as to form bearing surfaces for the rollers arranged in said openings.

2. A roller bearing cage consisting of a one-piece cast metal body portion of approximately sleeve form provided with roller openings for receiving rollers that extend longitudinally of said body portion, and a cylindrical-shaped reinforcing member of relatively stronger metal embedded in said cast metal body portion and permanently combined with same and provided with portions which lap over the ends of said roller openings so as to form bearing surfaces for the ends of the rollers.

3. A roller bearing cage consisting of a substantially tubular-shaped sheet metal member having longitudinally extending openings for receiving rollers and provided with laterally projecting integral portions that form bearing surfaces for the ends of the rollers, and a cast metal body portion combined with said sheet metal member and provided with alining openings through which the rollers project.

4. A cage for roller bearings consisting of a one-piece cylindrical-shaped body portion formed of cast metal and provided with longitudinally extending roller openings, and a metallic reinforcing and strengthening member of corresponding shape embedded in said body portion and provided with portions that extend over the ends of the roller openings in said body portion so as to form bearing surfaces for the ends of the rollers.

In testimony whereof I hereunto affix my signature in the presence of two witnesses, this sixth day of July 1911.

CHESTER A. HEINZELMAN.

Witnesses:
WELLS L. CHURCH,
GEORGE BAKEWELL.